Jan. 10, 1961  J. C. LEE ET AL  2,967,700
WHIPPING AND AERATING APPARATUS
Filed March 1, 1955  2 Sheets-Sheet 2
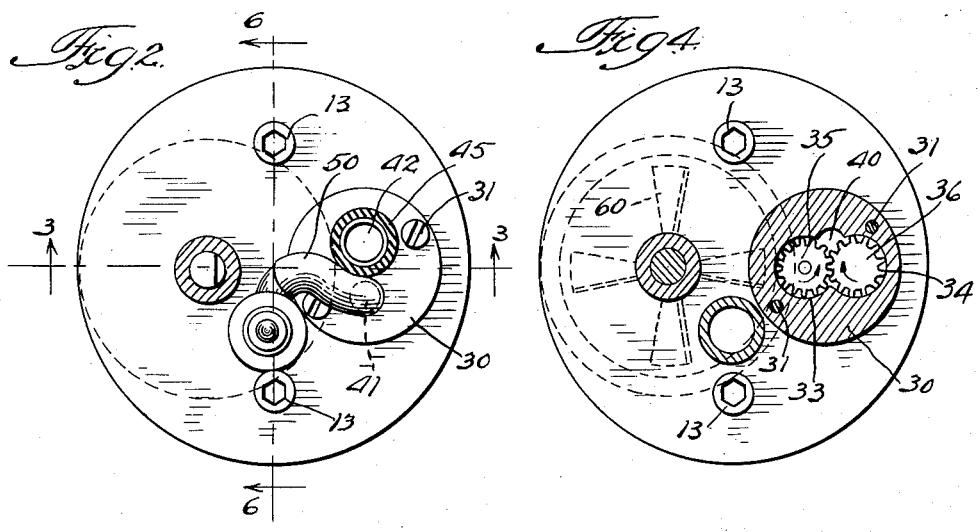
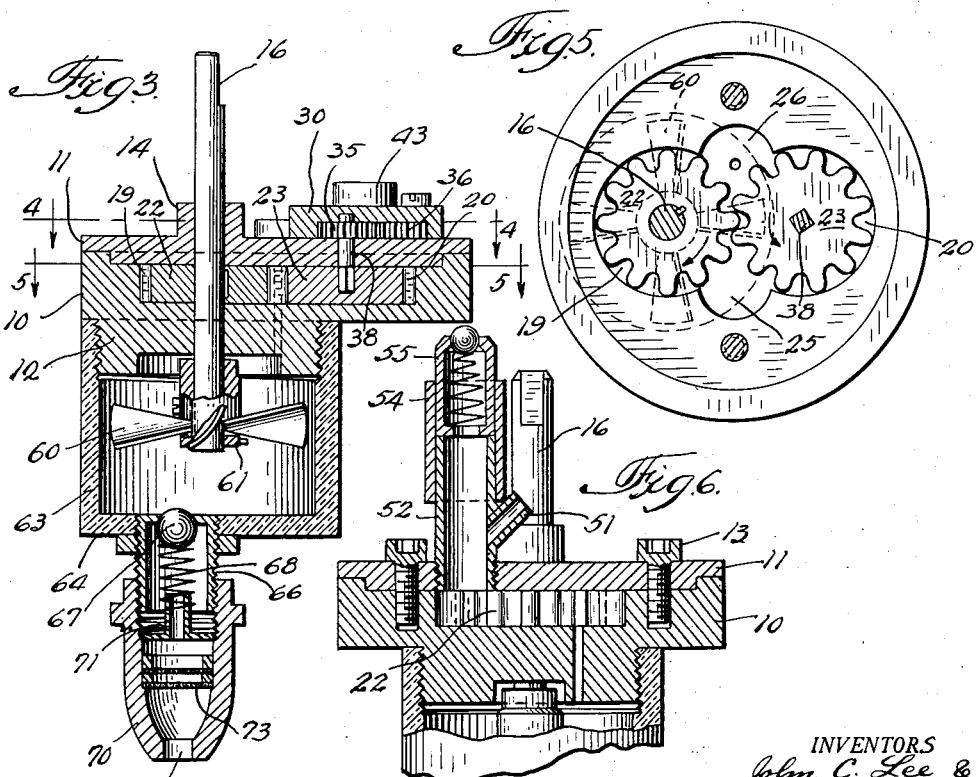
INVENTORS
John C. Lee &
BY Alexander Forsyte

United States Patent Office 2,967,700
Patented Jan. 10, 1961

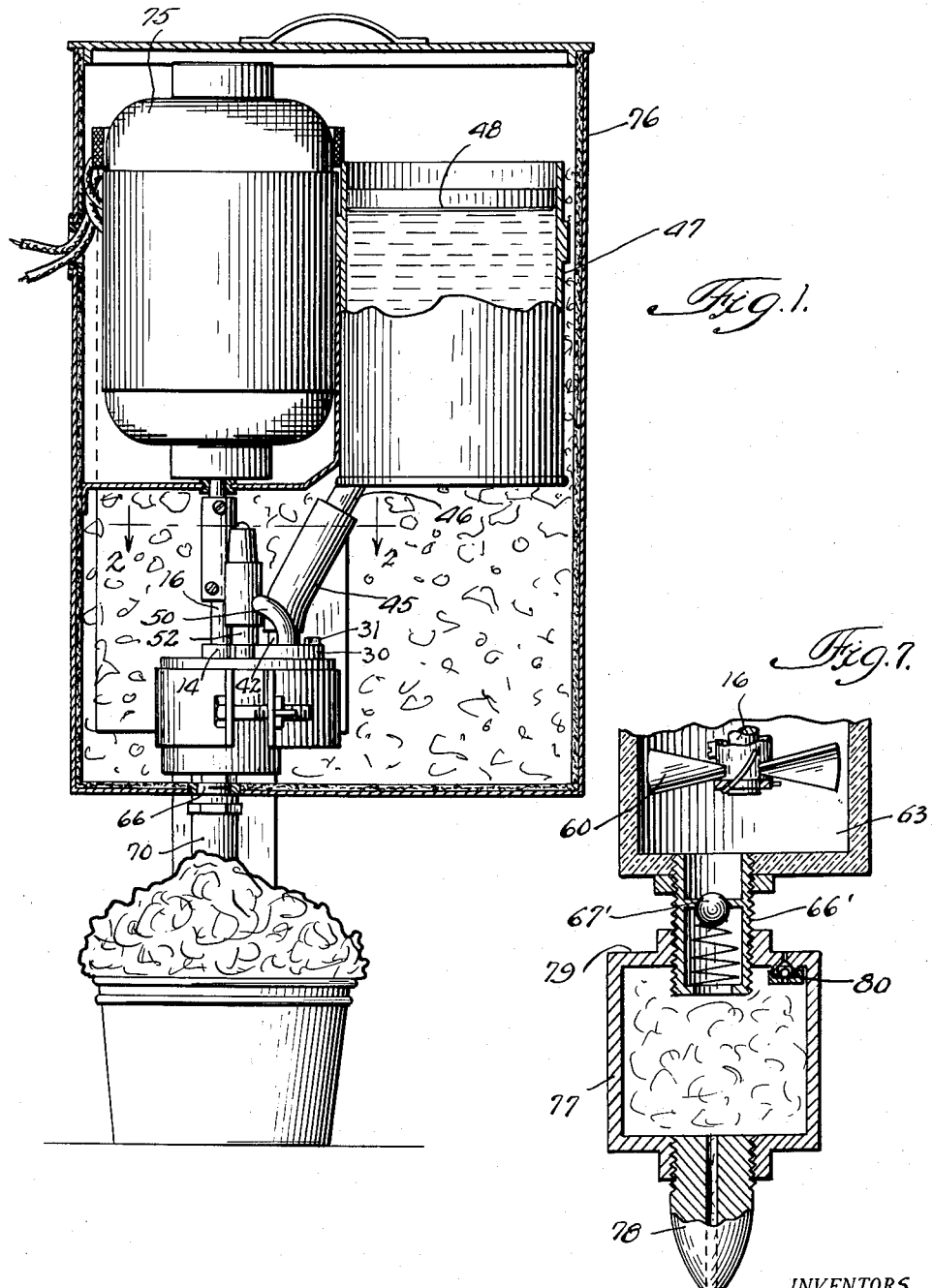

2,967,700

WHIPPING AND AERATING APPARATUS

John C. Lee, Park Forest, and Alexander Forsyte, Chicago, Ill., assignors, by mesne assignments, to Morris B. Kallison, Chicago, Ill.

Filed Mar. 1, 1955, Ser. No. 491,450

7 Claims. (Cl. 261—140)

This invention relates to a whipping and aerating apparatus useful in connection with whipping cream, ice cream, toppings and other foodstuffs which are desired in whipped form. While the apparatus embodying the present invention may be used for other purposes than whipping and aerating food materials, the invention finds its greatest utility in small size units for use in whipping food materials, of which cream or topping is an example.

As is well known, various types of creams or toppings, or ice milk may be whipped. Thus cream from milk or topping made from vegetable fats or combinations of both in different viscosities—both emulsions—may be whipped to form a fluffy mass for use as foods and drinks. Ice cream, whipped cream, sherbets, gelatine molds, batters, cheese, egg white, mayonnaise and other materials may also be handled. Soft ice cream in particular may be readily made.

Conventional methods of whipping involve the use of beaters which act to agitate the cream, or vegetable fat preparations or ice milk used in soft ice cream, or other material to be whipped so that bubbles of air are entrapped. Whipped cream may be considered as whipping cream and gas (as air for example) in two phases. The cream material forms the outer or continuous phase and the gas forms the inner or discontinuous phase. Surface tension of the cream operates to maintain the material in a whipped condition. Because of the effects of temperature on surface tension and emulsions, it is necessary to whip cream below critical temperatures. Thus it is well known that whipping cream from dairies must be whipped by conventional beaters, such as egg beaters, if the whipping cream is chilled. Vegetable fat creams may be handled at higher temperatures. Such whipping is time-consuming.

It is also possible to obtain whipped cream from tanks containing a mixture of compressed air or gas and whipping cream by releasing the whipping cream and air or gas through a fine orifice. The compressed gas may be air, nitrogen, carbon dioxide or other inert gas. Such tanks each have a manually controlled valve which permits the compressed gas to force the whipping cream into atmosphere, this accomplishing whipping simultaneously with the discharge of the whipping cream.

This latter method of dispensing whipped cream is highly advantageous and widely used but suffers from inherent drawbacks. Refillable tanks containing the whipping cream must be filled with special machinery at some depot from where they are distributed to the various users. Such refillable tanks usually contain a substantial quantity of cream to reduce the expense of transportation and handling and consequently involve storage problems. The pressure to which the tanks are charged is customarily of the order of about 140 lbs. p.s.i. and constitute a potential hazard. While small containers charged with gas and containing some whipping cream are sold in stores for use in homes, such units are not refillable, are too small and are not economical enough for use in locations like drugstores, restaurants and the like.

The present day manufacture of soft ice cream (this is a low fat content material) requires the use of elaborate and expensive equipment so that the manufacture of same is relatively expensive and is confined to certain establishments. With this invention, any soda fountain or drug store may produce and dispense soft ice cream. The apparatus here employed is relatively small, about the size of a portable malt mixer, is portable and occupies very little space. This apparatus and method may likewise be used in bakeries for covering cakes and other bakery goods.

This invention makes it possible immediately to whip materials such as whipping cream, toppings, ice milk and other similar materials into a desirable whipped material.

This invention in general provides apparatus for effecting quick and satisfactory whipping of a whipping material. One aspect of the invention contemplates two-stage pumping. The first pumping stage operates on the whipping material such as cream or topping or ice milk only and the output of the first stage supplies the whipping material to the input of the second stage to insure a continuous feed of whipping material to the intake of the second stage. As is suggested later, pressure feed of the whipping material may be used instead of the first pumping stage. The intake of the second stage is also supplied with the gas which is to be whipped into the whipping material, such gas usually being air but obviously capable of being carbon dioxide, nitrogen or any other inert gas as desired.

The second stage pump means must handle the entire output of the first stage in the form of whipping material and additionally must accommodate the gas to be mixed with the whipping material. Thus in case of whipping cream to be whipped with air, the second stage must accommodate all of the cream supplied to the intake by the first stage and in addition thereto must accommodate all of the air to be whipped into the cream.

In the case of whipping cream, as an example, it has been found that a volume ratio of about 39 parts of air at atmospheric pressure and about one part of cream will form a satisfactory whipped cream. Such a whipped cream will have a volume ratio of between about 1.5 and about 2 times the original volume of the cream.

These figures are given for illustrative purposes in connection with a discussion of the relative capacities of the two-pump stages and will vary with the nature of the cream, the volume ratio of the whipped article, the pressure of the air or other gas to be whipped into the cream, and the nature of the whipped material.

Referring back to whipping cream and air at atmospheric pressure as an example, and assuming that 39 parts of air and one part of cream is a desirable mixture, it follows therefore that the second stage pump should have a pumping capacity of about forty times the pumping capacity of the first stage pump. The air or gas supply at the intake of the second stage pump may either be aspirated, in which case the first stage pump should not supply the cream at any appreciable pressure, or the air or gas may be supplied to the intake under pressure from a separate air pump or compressed air cylinder or the like. In the latter case, the first pump stage may supply the cream to the intake of the second stage at the same pressure as the gas supply.

The output of the second stage pump consists of a mixture of gas, such as air, and whipping material, such as whipping cream, for example, and this mixture is forced into a mixing chamber. The mixing chamber should permit substantial pressure to be built up therein against which the second stage pump operates. The mixing chamber has means therein for finely dividing the whipping material to secure an intimate mixture of compressed gas and whipping material. From the mixing chamber, the mixture of whipping material and gas is permitted to discharge to atmosphere through a restricted orifice to provide whipped material.

As has been previously observed, a whipped material such as whipped cream involves surface tension effects and is sensitive to temperature in the case of dairy cream or vegetable fats or combinations of both. For obvious reasons, it is essential that in food products there be no contamination of the whipped material with such materials as lubricating oil or the like. Apart from the factor of cleanliness, the presence of foreign materials such as oil will have a profound effect upon the ability of the material to be whipped so that in whipping cream it is necessary to operate the two pump stages in a manner to avoid rise in temperature and in all cases of whipping to avoid the presence of lubricating oil. In addition to lubrication, a material like oil usually functions as a sealing medium in a pump between relatively moving surfaces to permit the build-up of pressure. It has been found that dividing the pumping of the whipping material into two stages as described above eliminates difficulties of pump seals and permits the second stage pump to build up a substantial pressure for proper operation. In the case of whipping cream or dairy or vegetable fats, it has been found that pressures of the order of from about 25 to as much as 75 lbs. p.s.i. may be obtained and makes possible desirable whipping action. A range from about 35 to about 50 p.s.i. is effective. The whipping material should remain at whatever temperature is desirable and avoid any substantial heating thereof. Thus the whipping material and pump may be refrigerated.

In addition to the above considerations, it is well known that retention of maximum amount of gas in a whipped material involves the generation of minute air cells or gas cells, the smaller the cells, the greater the amount of entrained gas. With the above considerations in mind, it has been found that the most convenient, and for most purposes, the most efficient form of pump for either stage is the gear pump. Other types of pump may be used and it is possible for one type of pump to be used for the first stage and a different type of pump to be used for the second stage. However, the preferred form of pump is the gear pump and an exemplary embodiment of the invention utilizing this type of pump will now be disclosed in connection with the drawings. It is understood, however, that variations may be made not only with respect to the detailed construction hereinafter disclosed and described but also with respect to the general type of pump.

It is also possible to have static means for supplying a continuous flow of whipping material to the intake of the second stage. However, this flow will have to be correlated to the starting and stopping of the second pump stage as well as the pump speed. In addition, where air is aspirated into the second stage with the whipping material, valves for shutting off the flow of whipping material to the second stage would be necessary if the first stage is eliminated. It has been found that two pumping stages operating together makes it possible to exercise precise control over the amount of whipping material supplied to the second stage.

Referring therefore to the drawings,

Figure 1 is an elevation of an apparatus embodying the present invention.

Figure 2 is a sectional view along line 2—2 of Figure 1.

Figure 3 is a sectional elevation along line 3—3 of Figure 2.

Figure 4 is a view along line 4—4 of Figure 3.

Figure 5 is a view along line 5—5 of Figure 3.

Figure 6 is a sectional detail along line 6—6 of Figure 2.

Figure 7 is a sectional detail of a modified discharge nozzle for permitting a compact ribbon of whipped cream to be discharged.

The apparatus embodying the invention includes a housing consisting of plate 10 having top cover plate 11 and depending boss 12. Plate 10 is preferably of metal, although it may be made of plastic or other rigid material and may conveniently have a circular outline as illustrated in Figures 2, 4 and 5. Cover 11 and the top edge of plate 10 are suitably shouldered to provide a stepped arrangement for convenient locking. Bolts 13 are provided to retain cover 11 on plate 10. Cover 11 has boss 14 extending upwardly therefrom and eccentric to the cover plate. Journaled in boss 14 is drive shaft 16 extending down through plate 10 and boss 12 into the region below boss 12.

Plate 10 has the interior hollowed out to provide a sort of four-leafed chamber characteristic of gear pumps. Thus referring to Figure 5, large chambers 19 and 20 are provided for accommodating meshing gears 22 and 23 respectively. Chambers 19 and 20 are generally circular in plan with a region where the teeth of gears 22 and 23 mesh. Flanking the region where the gear teeth mesh are small lateral chambers 25 and 26. Gears 22 and 23 form the second stage pump and the gears are provided with suitably shaped cooperating teeth for effecting pumping action. Gears 22 and 23 may be of any suitable material such as metal or synthetic products used for the manufacture of gears in order to minimize noise. Thus for quiet running, one gear may be of metal while another gear may be of Bakelite, nylon or other suitable material.

Gear 22 is the drive gear of the second stage pump and has drive shaft 16 passing through the same and suitably keyed thereto. The key for joining the drive shaft to the gear may function not only to couple the two rotatively but may also be used to lock drive shaft 16 longitudinally to prevent the drive shaft from moving up or down except for some play. As is well understood in gear pumps, chambers 19 and 20 within which the respective gears 22 and 23 operate are dimensioned to provide minimum clearance for the gear teeth. Gears 22 and 23 turn in the direction indicated by the arrow with the result that lateral chamber 25 constitutes the intake port for the second stage pump and lateral chamber 26 constitutes the outlet port for the pump.

The first stage pump is housed between cover plate 11 and auxiliary housing plate 30. Auxiliary housing 30 may have a generally circular shape as illustrated in Figure 2 and is rigidly attached to cover plate 11. Thus as illustrated in Figures 2 and 3, auxiliary housing 30 is retained in position by bolts 31 and is so located as to be directly above the center of gear 23 of the second stage pump.

Auxiliary housing 30 is recessed to accommodate a pair of gears operating as a first stage gear pump, the recess in auxiliary housing 30 generally resembling the recess in plate 10 but being physically smaller. Thus referring to Figure 4, auxiliary housing 30 has a chamber consisting of main compartments 33 and 34 for accommodating gears 35 and 36 respectively. Gears 35 and 36 have suitably shaped gear teeth for pump action. Gear 35 is directly above and alined with gear 23 and the two are coupled by stub shaft 38 extending through a journal formed in cover 11. Auxiliary housing 30 is provided with inlet port chamber 40 laterally of the region where gears 35 and 36 mesh. An outlet port for the first stage pump is provided by passage 41 (Figure 2) in auxiliary housing 30, passage 41 being properly located with respect to the meshing gear teeth for that purpose. It is understood that discharge port 41 is immediately above gears 35 and 36 so that the discharge of the first stage is generally vertically with respect to the planes of gears 35 and 36.

Inlet port chamber 40 communicates with passage 42 extending through auxiliary housing 30 and through boss 43 projecting above the top of auxiliary housing 30.

For supplying cream or other material to be whipped to the inlet of the first stage pump, intake hose 45 of suitable material such as rubber, for example, may be provided, the hose being slipped over boss 43 and having the upper end thereof attached to outlet 46 of container 47 in which the whipping material is stored. It is understood that inlet 42, pipe 45 and outlet 46 should be sufficiently large so that a satisfactory flow of whipping material will occur during operation. If desired, container 47 may be sealed and have some slight gas pressure therein exerting force upon the whipping material and tending to feed the same into the intake of the first stage pump under a slight pressure. Heavy plate 48 slidable within container 47 may be used to create some feed pressure as well as insure that the whipping material does not cling to the sides of container 47.

Outlet 41 of the first stage pump extends through auxiliary housing 30 and the outlet passage is continued by providing curved tube 50 (Figure 1 and 2) extending upwardly and laterally. Tube 50, which may be a short length of flexible hose, extends over nipple 51 carried by fitting 52 supported in cover plate 11. Fitting 52 consists of a hollow pipe having the bottom thereof threaded into a suitably tapped aperture in plate 11, the aperture in plate 11 terminating above intake port 25 of the second stage pump. Fitting 52 has its top end 54 provided with check valve 55 for permitting air to be sucked into the fitting and thus into intake region 25. Any suitable type of valve may be provided and instead of having fitting 52 communicate with the atmosphere through the valve, it is possible to slip a hose over pipe 52 and connect the hose to air or gas under a suitable pressure.

It is understood that the dimensions of the various gears forming the two pump units are selected and the gear teeth ratios are selected so that a desired capacity ratio between the two pumps is established. As hereinbefore stated, in the case of cream for whipping, a ratio of 39 parts of air to one part of cream by volume has been found to be satisfactory at room temperature of about 70° F. This ratio, however, is based upon air being supplied or available at atmospheric pressure. It is clear that the ratio will vary depending upon the pressure at which air or gas is supplied, the nature of the whipping material, and the like.

The mixing chamber into which the second stage pump feeds should preferably have a minimum volume for the reason that when the apparatus stops, back pressure in the chamber may force some cream back through the pump and into the air intake fitting 52. In the absence of a check valve, cream may be forced out into the air. Even with a check valve, the presence of cream at the check valve is objectionable.

For proper operation of the method and apparatus, it is essential that the mixing chamber permit the whipping material and gas to discharge but at such a rate as to maintain a desirable back pressure within the mixing chamber. The back pressure is impressed upon the output of the second stage pump and thus has an effect upon the mixing of the whipping material and gas. The mixing chamber must also have means for securing a fine division of the whipping material so that the gas may be intimately mixed therewith.

While static type of mixing means such as, for example, mesh materials, perforated baffles and the like, may be provided through which whipping material may be forced, such static means generally require substantial volumetric capacity for suitable operation. It is preferred, therefore, to provide mechanical mixing means within the mixing chamber for beating the whipping material and gas together. In addition, some static mixing means, as wire mesh, is provided at the outlet where whipped cream is discharged.

Referring particularly to Figure 3, drive shaft 16 passes through boss 12 and carries at its lower end beater 60. Beater 60 has hub portion 61 keyed or locked to drive shaft 16. The beater also has a number of blades, here illustrated as four (Figure 4), shaped generally like fan blades. The beater operates within a chamber defined by cup-shaped member 63 rigidly attached to boss 12 by providing cooperating threading on the outside of the boss and the interior of the cup near the rim thereof.

It is preferred to have the volume defined by cup 63 as small as possible consistent with proper operation and the volume of the mixing chamber is preferably no more than about five times the volume of the second stage gear pump chambers. The mixing chamber normally operates with a back pressure therein. When pumping ceases, back pressure in the mixing chamber is likely to force material back into the second pump stage. The discharge opening for the mixing chamber, to be described later, also provides an exit for material after the pump stops operating. Cream and air will be discharged from the mixing chamber upon cessation of pumping through the discharge opening as well as through the pump until the pressure in the mixing chamber drops to atmosphere. By having the volume of the mixing chamber as small as possible, discharge of cream back through the pump stage into the gas supply conduit will be reduced.

The restricted discharge means for the mixing chamber is located at bottom 64 of the cup-shaped member forming the mixing chamber. Bottom 64 has a threaded opening therein into which is disposed nipple 66. Within nipple 66 is a check valve consisting of ball bearing 67 and spring 68, the ball bearing cooperating with a valve seat in the end of nipple 66. Sleeve 70 is threaded over nipple 66 and has within it short pipe 71 carried by apertured disc wedged in sleeve 70 for controlling the compression of spring 67. Sleeve 70 is provided with one or more wire screens 73 and discharge opening 74.

The pressure on the check valve is adjusted to a desired value by turning sleeve 70. It will be clear that cream and air will be further mixed while passing through wire screens 73 within sleeve 70.

The entire apparatus is powered by electric motor 75 having a shaft coupled to drive shaft 16. Since the two pumps are rigidly coupled together, it is clear that the pump capacity ratio between stages will be maintained over all motor speeds. Furthermore, the agitating means within the mixing chamber is also rigidly coupled to the pumps so that the operating level of the agitator is maintained in proper balance to the operating level of the two pumps.

The spring pressure on air inlet valve 55 may be properly controlled so that slight suction within fitting 52 will suffice to permit air to be aspirated through the check valve.

It may be desirable to have the check valve normally open at atmospheric pressure inside fitting 52 and have the check valve closed in the event of a rise in pressure within fitting 52. This rise in pressure above atmospheric pressure would occur when the entire mechanism is stopped and the material in the mixing chamber is backing up through the pump. In such case, check valve 55 would close. This closing action of the check valve to restrain backward movement of material from the mixing chamber will also occur if the check valve is normally closed at atmospheric pressure and opens under some suction pressure.

By adjustment of sleeve 70 to control the amount of back pressure existing within the mixing chamber, some control over the quality of the whipped mixture may be obtained. Such control may be necessary to compensate for variations in temperature of the whipping cream, the exact composition of the whipping cream, and other factors.

It is also possible to separate the two pumps and drive them by individual motors. In such case, the two motors should have substantially constant speeds so that they may be considered as coupled together through a common source of electric power. As an example, induction motors, when properly loaded, will not vary much in speed. Assuming that the motors are properly coupled to their respective pumps, then common energization will result in satisfactory operation. Under such conditions, the first pump stage may feed its output through a hose or pipe of suitable length to the input of the second pump stage.

The arrangement illustrated in Figure 1 is convenient for the reason that the two pumps form a compact unit which together with container 47 may be readily refrigerated. Thus pail 76 may be provided within which substantially the entire mechanism is housed. The pail is compartmented so that motor 75 is isolated. Water tight grommets may be provided where the motor shaft passes through one wall and where nipple 66 passes through another wall. The pail may have cracked ice for chilling the pumps and whipping cream container. Other cooling means may be provided. Referring now to Figure 7, there is illustrated a modified discharge nozzle for providing an unbroken pencil of whipped cream or whipped material. This may be desirable where a cream trace delineating some design, figure or number is desired. For example the entire apparatus illustrated in Figure 1 but having the nozzle of Figure 7 may be held in the hand and manipulated to secure a desired outline of whipped cream. In this figure, nipple 66' is generally similar to nipple 66 in Figure 3, and is provided with check valve 67' somewhat lower down in the nipple. Threaded over nipple 67' is cream and air separating chamber 77 having discharge nozzle 78 at the bottom thereof.

Chamber 77 has top wall 79 through which nipple 66' extends; nipple 66' extends into the interior of chamber 77 for a distance. Chamber 77 has the interior thereof free and has outlet valve 80 in top wall 79. Outlet valve 80 will permit air to discharge through the vent to atmosphere. Valve 80 presents a resistance to outward flow which is high compared to nozzle 78. Consequently whipped cream fed into chamber 77 will tend to flow through nozzle 78. Air or other gas which has not been combined with cream as a whip will tend to separate, rise to the top of chamber 77 and escape through valve 80. Thus a substantially continuous roll or pencil of whipped cream will emerge. It is understood that the apparatus is used so that in all cases the whipped cream or whipped material is discharged downwardly.

To clean the apparatus, container 47 is emptied of the whipping material and filled with hot water. A flexible hose not shown is inserted so that one end of the hose is positioned in the container 47 and the other end is connected to the check valve 55. Motor 75 is started and forces the water through the apparatus to clean same.

This application is a continuation in part of our application S.N. 461,749, filed October 12, 1954, now abandoned.

It will be understood that various changes and modifications may be made from the foregoing without departing from the spirit and scope of the appended claims.

What is claimed is:

1. Apparatus for whipping material in relatively small quantities, said apparatus comprising a first plate having chambers, a pair of meshing gears in said chambers for pumping purposes, said chambers including intake and discharge ports for a second pump stage, a cover for said first plate, a second plate cooperating with said cover and having chambers, a pair of meshing gears in said chambers functioning as a first stage gear pump, said first stage having intake and discharge ports, a rigid connection between a gear of the first pump stage and a gear of the second pump stage so that the two stages are driven in predetermined fixed relation, said first stage having a substantially smaller pumping capacity than said second stage, means for supplying whipping material to the intake of said first pump stage, means for feeding the output of said first stage to the intake of said second stage, means for supplying gas to the intake of said second stage, said second stage functioning to operate on all of the whipping material supplied thereto by the first stage and to accommodate gas in predetermined fixed relation to the quantity of whipping material, a mixing chamber rigidly supported on said first plate and extending below one of the gears of said second stage pump, a drive shaft extending through one gear of said second stage pump and into the mixing chamber, said drive shaft being adapted to be driven by a suitable source of power such as an electric motor, agitating means within said mixing chamber coupled to said drive shaft, means for connecting the discharge of said second stage to said mixing chamber and restricted discharge means carried by said mixing chamber for permitting the discharge of material from said mixing chamber to atmosphere while maintaining a back pressure within said mixing chamber.

2. The construction according to claim 1 wherein said restricted discharge means includes wire screens.

3. An apparatus for whipping cream comprising a first plate normally horizontal in operating position, said first plate having recesses in the top surface thereof, a pair of meshing gears for gear pump action in said recesses, said recesses including intake and discharge ports, a cover plate for said recessed plate, a drive shaft passing through said cover plate and recess plate and through one of said meshing gears, said meshing gears forming a second stage gear pump, a second recessed plate disposed on top of said cover plate, said second recessed plate being substantially smaller than said first recessed plate and having the recess in the bottom thereof, a pair of meshing gears for a gear pump in said recesses, said recessed second plate having inlet and outlet ports, a stub shaft extending through said cover plate and coupling the other gear of said second stage pump with a gear of the last-named pump, said last-named pump functioning as a first stage pump, means for supplying whipping cream to the intake port of said first stage pump, means connecting the discharge port of said first stage pump with the intake port of the second stage pump, said connecting means including an air intake for mixing air with said discharged cream at the intake of said second stage pump, said second stage pump having a pumping capacity about forty times that of the first stage pump for handling cream to be whipped, a cupped member attached to the bottom of said first recessed plate below said one gear of said second stage pump, said cup-shaped member forming a mixing chamber, means connecting the discharge port of the second stage pump to said mixing chamber, said drive shaft extending into said mixing chamber, and check valve discharge means in the bottom of said mixing chamber for permitting discharge of said material from said mixing chamber to atmosphere, said drive shaft being adapted to be driven by a motor.

4. The apparatus according to claim 3 wherein said mixing chamber has a relatively low volume, the back pressure in said mixing chamber being adapted to have a value in the range of from about 35 lbs. p.s.i. to about 50 lbs. p.s.i., said volume in the mixing chamber being such compared to the volume of the second stage pump and the air intake for the second stage pump that upon cessation of operation, the material in said mixing chamber will not escape into the air supply part of the system.

5. The apparatus according to claim 3 wherein the means for supplying air to the intake of said second stage pump comprises an aspirating tube having a check valve adapted to close upon back pressure at the intake of said second stage pump.

6. The apparatus according to claim 3 wherein means for chilling the pump, mixing chamber and cream supply is provided.

7. Apparatus according to claim 3, wherein said check valve discharge means includes a nozzle having wire screen means for further mixing of air and cream.

References Cited in the file of this patent

UNITED STATES PATENTS

| | | |
|---|---|---|
| 1,726,663 | Grant | Sept. 3, 1929 |
| 1,734,779 | Randolph | Nov. 5, 1929 |
| 1,889,236 | Burmeister | Nov. 29, 1932 |
| 1,917,577 | Doble | July 11, 1933 |
| 1,927,376 | Schroder et al. | Sept. 19, 1933 |
| 1,993,338 | Crowe | Mar. 5, 1935 |
| 2,324,116 | Sivertsen | July 15, 1943 |
| 2,342,972 | Roy et al. | Feb. 29, 1944 |
| 2,375,833 | Urquhart | May 15, 1945 |
| 2,654,585 | Heesen | Oct. 6, 1953 |

FOREIGN PATENTS

| | | |
|---|---|---|
| 340,268 | Great Britain | Dec. 22, 1930 |
| 456,273 | Great Britain | Nov. 5, 1936 |
| 689,818 | Great Britain | Apr. 8, 1953 |